United States Patent [19]

Larsson et al.

[11] Patent Number: 5,546,387
[45] Date of Patent: Aug. 13, 1996

[54] LABEL HANDLING IN PACKET NETWORKS

[75] Inventors: Leif M. Larsson, Stockholm; Hans A. P. Berghager, Älvsjö, both of Sweden

[73] Assignee: Telefonakteibolaget LM Ericsson, Stockholm, Sweden

[21] Appl. No.: 208,386

[22] Filed: Mar. 10, 1994

[30] Foreign Application Priority Data

Mar. 10, 1993 [SE] Sweden ................................. 9300793

[51] Int. Cl.⁶ .................................................. H04L 12/56
[52] U.S. Cl. .................................................. 370/60
[58] Field of Search .......................... 370/60, 60.1, 94.1, 370/94.2, 94.3, 85.13, 53, 54, 55, 56, 57, 58.1; 395/325, 400, 425, 842, 280, 427

[56] References Cited

U.S. PATENT DOCUMENTS

| | | | |
|---|---|---|---|
| 3,979,733 | 9/1976 | Fraser | 395/325 |
| 4,218,756 | 8/1980 | Fraser | 395/425 |
| 4,494,230 | 1/1985 | Turner | 370/60 |
| 4,894,822 | 1/1990 | Buhrke et al. | 370/60 |
| 4,947,388 | 8/1990 | Kuwahara et al. | 370/60 |
| 4,995,032 | 2/1991 | Demichelis et al. | 370/60 |
| 5,099,475 | 3/1992 | Koziki et al. | 370/60 |
| 5,166,926 | 11/1992 | Cisneros et al. | 370/60 |
| 5,287,349 | 2/1994 | Hyodo et al. | 370/60.1 |

FOREIGN PATENT DOCUMENTS

| | | |
|---|---|---|
| 206403 | 12/1986 | European Pat. Off. . |
| 282197 | 9/1988 | European Pat. Off. . |
| 406842 | 1/1991 | European Pat. Off. . |
| 481447 | 4/1992 | European Pat. Off. . |
| 537036 | 4/1993 | European Pat. Off. . |
| 478445 | 1/1976 | U.S.S.R. . |

Primary Examiner—Douglas W. Olms
Assistant Examiner—Dang Ton
Attorney, Agent, or Firm—Burns, Doane, Swecker & Mathis, L.L.P.

[57] ABSTRACT

In a packet network for electronic transfer of data packets from one end station to another end station, there are, in the conventional way, a number of switch units. Each end station is connected to a switch unit, and the switch units perform the transfer of data packets along an established connection. The switch units are provided with switch ports on all of their connections. In these switch ports, a substitution is performed of labels of the data packets, both for data packets arriving to the switch unit and for data packets forwarded from the switch unit. The substitution prevents data packets belonging to different connections from having the same label and also offers distributed services in the data network. The data packet labels are constructed of a VPI field and a VCI field and, for data packets that arrive directly from or are sent directly to an end station, a GFC-field. In the substitution of the label of a data packet arriving to a switch unit, a table look-up is first performed in the associated switch port by way of the contents of the VPI field of the data packet. The result of the table look-up gives a direct information if the data packet belongs to a connection having a label comprising only a VPI field (VP connection), and then its contents are replaced by a record obtained in the table look-up. If the data packet has both a VPI field and a VCI field (VC connection), its VPI and VCI fields are replaced by new label portions obtained from a second table look-up.

27 Claims, 7 Drawing Sheets

INCOMING SIDE TABLE OF V P I NUMBERS

Fig. 4

|  | | FLAG | FLAG |
|---|---|---|---|
| | BASE ADDRESS | 1 | |
| | | 0 | |
| VPI = 2 | NOT USED  INTERNAL LABEL | 1 | 0 |
| VPI = 1 | INTERNAL LABEL | 0 | 0 |
| VPI = 0 | INTERNAL LABEL | 0 | 0 |
| | INTERNAL LABEL | | |

ADDRESS OBTAINED
BY MEANS OF VPI No.

"TO UNI/NNI"  "VP/VC LINK"

INCOMING SIDE TABLE OF V C I NUMBERS FOR VC CONNECTION

Fig. 5

BASE ADDRESS →

VCI = 1
VCI = 0   INTERNAL LABEL   FLAG

"TO UNI/NNI"

Fig. 6

INCOMING SIDE
TABLE OF WHOLE LABLE

| | FLAG |
|---|---|
| | 1 |
| | 0 |
| | 0 |

"TO UNI/NNI"

ADDRESS OF RECORD 3
ADDRESS OF RECORD 2
ADDRESS OF RECORD 1

LABEL OF INCOMING PACKET

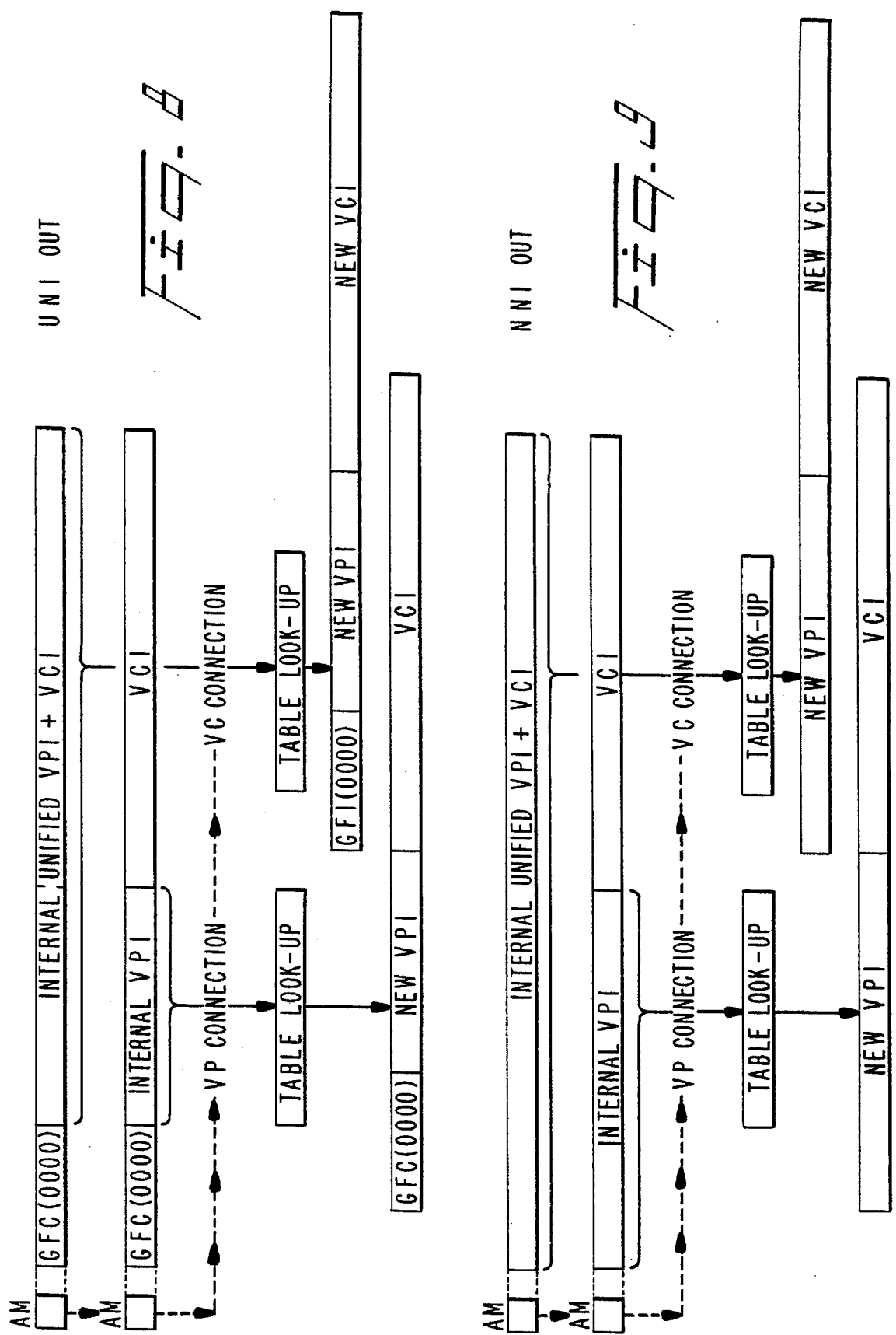

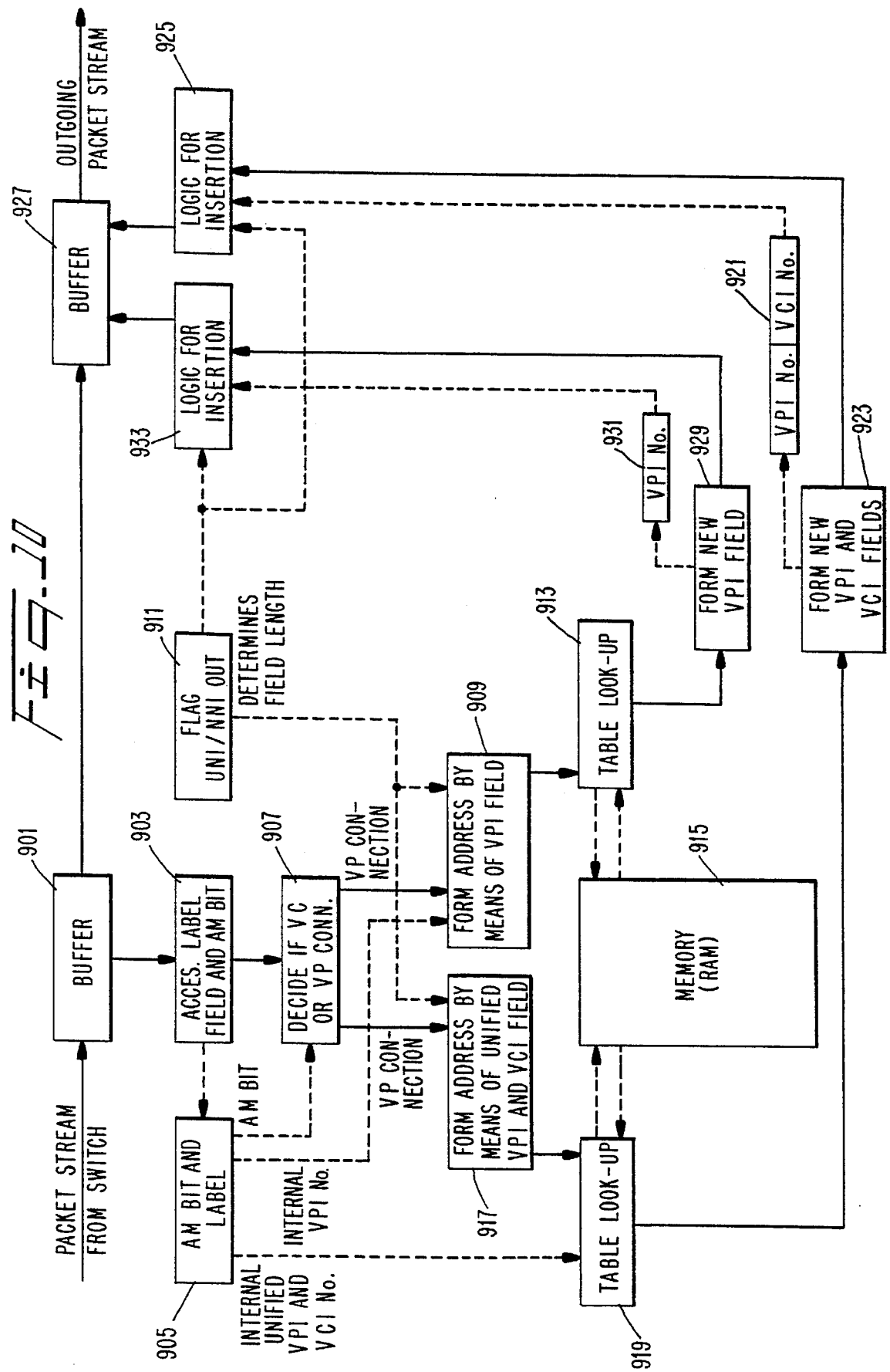

LABEL HANDLING IN PACKET NETWORKS

BACKGROUND

The present invention is related to networks and switches for the transmission or transfer of data packets or data cells and in particular a processing performed at the incoming and outgoing sides of a switch involving a translation of the labels, which data packets carry for identifying that they belong to a particular logical connection established through the network and the switch.

This application claims priority from Swedish Patent Application No. 9300793-8, filed Mar. 10, 1993, which is incorporated here by reference.

In a data packet network it is required, in the transfer of data packets from sending units to receiving units through various nodes in the network, that each data packet can be uniquely assigned a connection, which has been established earlier in the setup of the logical connection through the network. It is achieved by providing the data packets with labels, i.e. a special field comprising identification information. In the transfer in the network through many nodes, where the data packet is switched from an incoming connection line to an outgoing connection line, it may occur that data packets have been provided with the same label what will cause difficulties or even errors in the transmission.

Data packets belonging to different types of established connections may in addition have label fields of different formats, e.g. such that data packets belonging to some connections have a shorter label field while data packets belonging to other connections also have such a short label field but also in addition thereto a longer label field. In the second case the first short label field may then indicate a group of connections, of which the connection is a part. Such different parts may be present when for instance some established connections are assigned more permanent paths in the network than other connections. These different formats result in further problems in the processing of the labels of the individual data packets.

The data packets considered here are in the common way transmitted through the network from one end station to another end station. The end stations are then provided with a single connection interface, both for sending and for receiving, coupled through a connection line to an associated connection node in the network. Special format restrictions may then be valid for the labels depending if a data packet is transmitted directly from such an end station or is received by an end station or if a data packet is in the process of being forwarded between two switching nodes in the system.

The handling of in particular addresses in data packets is disclosed e.g. U.S. Pat. Nos. 4,894,822; No. 4,218,756; No. 3,979,733; and No. 4,494,230; and in European Patent Applications EP-A2 0 282 197 and EP-A2 0 206 403, and in Soviet Patent Application SU-A 478 445.

In the European patent application EP-A2 0 406 842 a packet switch network is disclosed comprising label processing at incoming and outgoing links of a switch. Therein the numbers in data packets identifying the logical connection—VP or VC number—are substituted by new numbers found in lists stored in memories at the incoming and outgoing sides of the switch. When many logical connections are to be simultaneously active, the lists will be correspondingly long and memory space therefor must be provided in the construction of the switch.

Label processing is also disclosed in European Patent Application EP-A2 0 481 447, and in U.S. Pat. Nos. 4,947, 388; No. 5,099,475; No. 4,995,032; and No. 5,166,926.

SUMMARY

It is an object of the invention to provide a network and a packet switch allowing an efficient use of the memory space available for storing label conversion lists at the incoming and outgoing sides of a switch.

It is another object of the invention to provide a network and a switch allowing a correct handling of particular fields identifying the type of link, on which a data packet has arrived to a switch and on which it is to be transmitted from the switch.

The objects mentioned above are achieved by a network and a switch according to the invention, by means of which also the difficulties mentioned above are avoided.

The network for the transfer of data packets thus in the common way comprises a number of end stations, from which the data packets are issued and which receive the data packets. The end stations comprise a connection or terminal point having a connection line extending to an associated switch unit. The switch units are nodes in the network and have a number of connection points of which some can extend to end stations and other to other switch units. Connection lines connect the different connection or coupling points of the switch units. Each connection point is bi-directed such that it comprises an output side and an input side. When information is to be forwarded from an end station to another one, in some way a connection is established in the network between these two end stations. This connection thus is a contemplated path through the network along which the various data packets in which the information to be transferred is carried, are guided through the network.

All switch units are on the connection points thereof provided with ports and in these a substitution is performed of a label in each data packet passing through the connection line of the port. These labels are established in the establishment of the connection and indicate the connection to which a data packet belongs. The substitution of the label is performed to prevent that several connections have data packets with the same label and to simplify the handling of labels in the network, such that each switch unit not necessarily must be provided with information in regard of exactly all labels used in the network. The substitution of the label of a data packet in the connection point, where the data packet arrives to a switch unit, can be supplemented by a substitution also in the port associated with the connection point, from which the data packet is forwarded from the switch unit.

As has already been mentioned, the substitution of the labels is performed to avoid that for instance data packets belonging to different connections, in their travel through a switch unit, will be provided with the same label. The label could in addition be used by each switch unit to send the data packet to the correct output connection point of the switch unit, but practically therefor a particular internal address is used being coded to control, in the simplest possible way, the various circuits from which the switching circuits or the switch core of the switch unit is constructed. The substitution of the label also on an output connection point is preferable, since hereby distributed services can be offered in a simple way in the network. Thus for instance a data packet which arrives to a switch unit, can be forwarded from the switch unit on several different connection lines and on these connection lines be provided with, when it is necessary, different labels in order that a confusion with labels of already existent connections will not occur.

In the substitution of the label of a data packet which is performed in the ports of the switch unit, in some way a list is established containing records with information relating to the method of substitution of the label of a data packet and also the new internal labels. For data packets arriving to a port all the internal labels and the corresponding arriving labels may thus be stored in this list, where the internal labels thus are the labels which a data packet will carry in its travel through the switch unit. This list can then for instance only contain all internal labels in a suitable sequence such that an internal address in the list has a position corresponding to the arriving label thereof, that is generally such that the list is addressed by means of the contents of the label field of the data packet or generally such that a table record is accessed in some way by means of the label of the data packet. A corresponding list may of course be arranged for the substitution of the internal labels in a port, from which the data packets are forwarded, where thus all the internal labels and the corresponding forwarding labels are collected in a list.

The labels of the data packets comprise two different parts, a first part and a second part, where only the first part is used for some connections, say for connections of a first kind, and both the first and the second part is used for other connections, say for connections of a second kind. A table look-up by means of the whole label field and for the substitution of the whole label could be performed if a sufficiently large and rapid memory was arranged for the list used in the table look-up. In order to reduce the requirement of memory a table look-up is performed, there is performed a first table look-up with the first part of the label of an arriving data packet as an entry or address in a first sublist. Hereby information can also be obtained in regard of the kind of connection to which the data packet belongs, i.e. if it belongs to a connection which has only a first label part, or if it belongs to the kind of connection which has both a first and a second label part. Further, in the first table look-up the new label part can be obtained which is to replace the first label part. In the case where the data packet belongs to a connection of the second kind, it could, however, also be considered that this substitution of the first part also is performed, but preferably the whole label comprising the first and second part is replaced by a new or a second table look-up in a second sublist. As an entry or address to this second list a pointer can be used based on both information obtained in the first table look-up and the second label part of the data packet. Further in some way information is also inserted in the data packet in regard of the kind of connection to Which the data packet belongs or generally if the data packet uses only the first label field or the two parts. This information is only retained internally in the switch unit and is removed on the output port, from which the data packet is forwarded from the switch unit.

The table look-up can be performed in the same way in an output port, where the internal label is substituted by a forwarding label.

Further data packets which arrive directly from an end station or are forwarded directly to an end station, can have a first label format, for instance in the shape of a short field, and the data packets being forwarded between switch units have a second label format, for instance in the shape of a longer field, such that the short field is a part of the longer field. In the establishment of a connection then the various label formats are established which are valid for data packets belonging to this connection, by the fact that indicator elements, for instance specific data bits in some register or memory, are transferred to various signal positions valid for the connection, i.e. if data bits are used, that they are set or reset. When a data packet then arrives to a switch unit and to a port thereof, it is decided in this arriving port by means of a the appropriate indicator element, if the packet from the switch unit is to be forwarded directly to an end station and, if it is the case, the label of the data packet is substituted by an internal label having the first format, and otherwise the label of the data packet is substituted by an internal label having the second format. In the case where the first label format is a short field being a part of a longer field, which constitutes the second label format, when necessary for some transfers, a longer field may be filled with data bits in the form of zeroes, such as in a transfer from shorter to longer fields for the label.

The lists, in which the table look-up according to the above is performed, can also be organized such that the possible contents of a data packet arrived to or received by a port, this data packet arriving from the outside or from the switch unit itself, are stored in a sequential order. Then the new contents of the label field are obtained from the position or the sequential number of the contents of the data packet in this list. This organization of a list is chosen, when an ordinary list would require too much memory space.

BRIEF DESCRIPTION OF THE DRAWINGS

The invention will now be described with reference to an embodiment, which is given for explaining but not limiting the invention and which is illustrated in the accompanying drawings, in which FIG. 4 shows the structure of a table for a part of the label which is associated with connections established more permanently than other connections, FIG. 5 shows a table for the processing of a second part of the label, FIG. 6 shows an alternative structure of a table for the processing of the whole label of an arriving data packet, FIG. 7 schematically illustrates the handling of a label of a data packet in an incoming side of an interface unit of a node in the network, FIGS. 8 and 9 show the two different formats of the label parts of packets in the network, where the translation thereof at the forwarding from a switching node is schematically illustrated in the lower portion of the figures, FIG. 10 schematically illustrates the handling of the label of a data packet on an output side of an interface unit of a node in the network.

DETAILED DESCRIPTION

Figure 1:
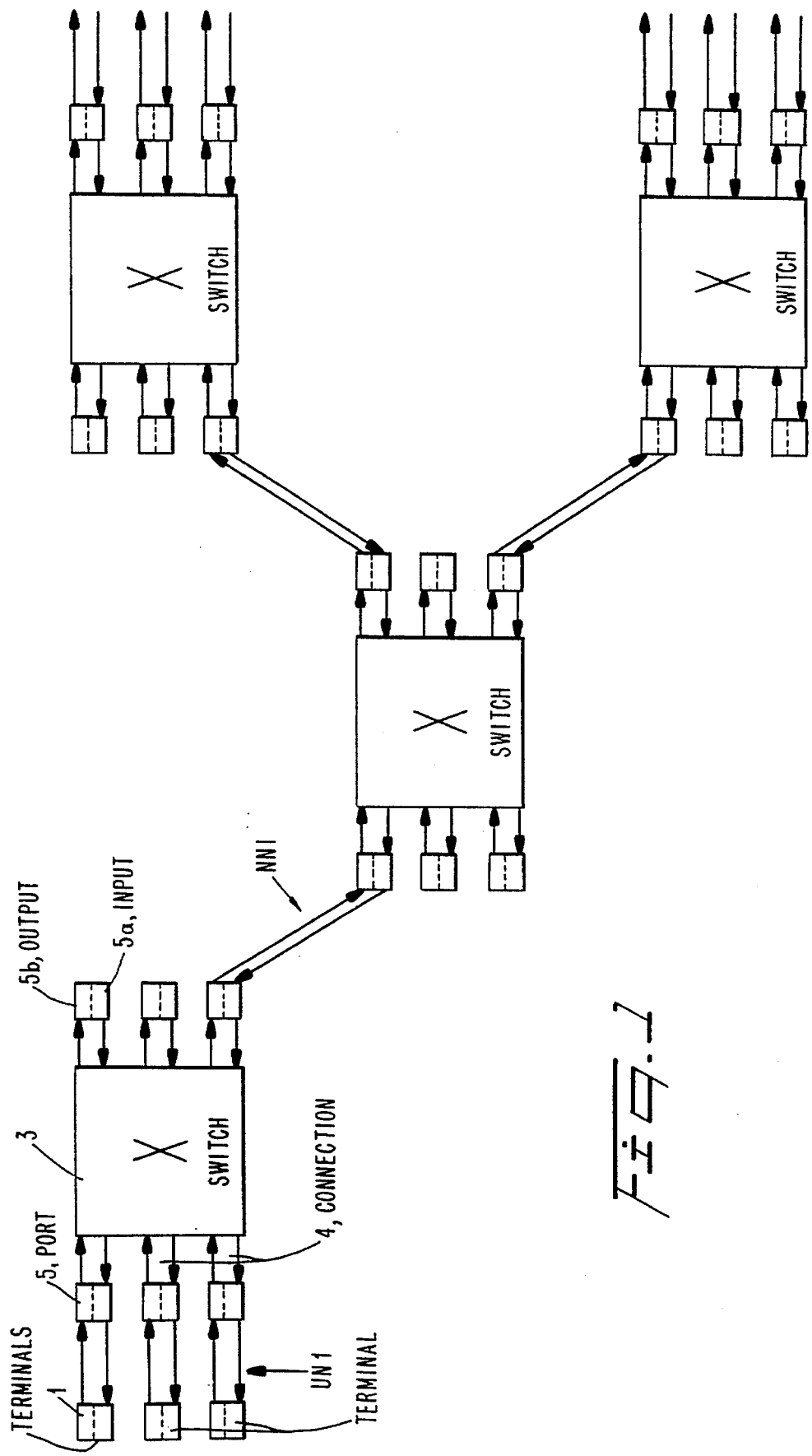
FIG. 1 is a schematic picture generally showing a network.

In FIG. 1 a network is schematically illustrated intended for the transfer of data packets, such as between end stations or terminals 1. The end stations 1 are thus both receivers and senders of the data packets, i.e. the origins or sources and the destinations of data packets considered here. The network in addition comprises a multitude of intermediate switching points or switches 3. Each end station 1 has basically only one connection point (not shown) which is bidirected and thus is arranged both for receiving and sending data packets. This connection point or unit is through appropriate lines coupled to a connection point 4 of a switching unit 3. The switch units 3 have several such connection points 4, which are also bidirected. The switching units 3 are, through some of their connection points, connected to other similar switching or exchange units 3.

When an end station 1 requests to start sending data packets in the network to another end station 1, a logical signal path is established through the network. Such a path can be established by the exchange of various messages or control information between the switch units 3. When a connection path is established, a message can be transmitted to the end station 1, which has requested the connection, that the connection now is established and is ready to be used for the transfer of data packets from the end station.

For each switch unit 3 its connection points 4 are provided by switching ports 5, one switching port arranged for each connection point. Every switching port 5 is divided into an input, incoming or arriving side 5a and an output, outgoing or forwarding side 5b, such that each data packet outgoing from a switch unit 3 will pass through the output side 5b of a switching port 5 and a data packet arriving to a switch unit 3 will pass through the input side 5a of a switching port 5. The physical links or connections between a end station 1 and its associated switch unit 3, this type of links in the figures being indicated as UNI, can be constructed differently and have other requirements on the connection and on the structure of the data packets than links or connections between two switch units, which in the figures are indicated as being type NNI.

In the transport through the network the data packets are provided with a field for identification of the packet and also containing other information relating to the handling of the contents of the data packet, and further the real or proper information field of the packet containing the user information which is to be transported from the source end station to the destination station. The identification field comprises a label field, the general configuration of which is illustrated at the top in FIGS. 2 and 3. The number or generally the information in this field identifies the established connection, to which the data packet belongs.

Figure 2:
FIGS. 2 and 3 show two different formats for the label portions of packets in the network, where the translation thereof at the arrival to a switching node is schematically illustrated in the lower portion of the figures.

A data packet forwarded on link from and to an end station has a label field with the configuration as indicated at the top of FIG. 2. The label field comprises three subfields, a field of four bits, in the figure indicated as GFC, a field of eight bits, in the figure indicated as VPI, and a field of sixteen bits, in the figure indicated as VCI. When a packet comprising a label field having this configuration is forwarded from an end station 1 to the associated switch unit, in the switching port 5 of the switch unit, to which the data packet will first arrive in the travel through the network, the information in the VPI field and possibly also the information in the VCI field are replaced or translated. If the data packet from this most adjacent switch unit 3 is to be sent back immediately to an end station 1 without any transport through other switch units, the field GFC of the data packet is not affected. Otherwise, when the data packet is to be transmitted further in the network and travel through another or several switch units 3, the GFC field is removed and the data packet is given the configuration illustrated at the top of FIG. 3.

The actual labels are comprised or written in the fields called VPI and VCI respectively. Some connections, called VP connections, have only information in the VPI field, while other connections, called VC connections, have information both in the field VPI and the field VCI. When a data packet arrives to a switch unit 3, it may happen, that its label as specified in the fields VPI and/or VCI coincides with the label of another connection and that data packets of this other connection arrive to the same switch unit 3 on another input port. To avoid a confusion of such labels the label fields are translated to or substituted by an internal label in the switching port or interface unit 5, on which the data packet arrives to the switch unit 3. In the case where data packets arrive directly from an end station, their label field thus has the configuration as illustrated at the top in FIG. 2. The label field is accessed in the switching port 5, i.e. in the input side 5a thereof, in order to be processed.

At the bottom in FIG. 2 the procedure is illustrated, in this case with data packets arriving directly from an end station, for changing the label field in the switching port 5. From the label field first the information carried in the VPI field is accessed. By means of this information a table look-up in a database or register is performed. From this table look-up information is first obtained, whether the data packet belongs to a VP connection or a VC connection. Further also information is obtained, whether the data packet is to be forwarded to an end station connection of the same kind, which here as above is called a UNI link, or if the packet is to be conveyed further in the network, the latter case as above also being called that the packet is to be forwarded next through an NNI link.

For the case when a packet arrives on a UNI link, the packet belongs to a VP connection and is to be forwarded directly to another end station connected to the same switch unit, that is to a UNI link, only the contents of the VPI field in the original data packet are substituted by a new VPI number, which is obtained directly from the table look-up, without any change of the length of the VPI field. If the data packet belongs to a VP connection but instead is to be forwarded to an NNI link, the VPI field is enlarged to comprise also the GFC field, such that the information in the GFC field and the VPI field is replaced by a new longer VPI number obtained in the table look-up. In the latter case, the GFC field is thus removed and in both cases the information in the VCI field is not affected.

If the data packet in the table look-up instead is decided to belong to a VC connection, in the table look-up new information is obtained which is used for an additional table look-up. At the same time other information is also obtained, in particular as above information whether the data packet is to be sent to a UNI link or to an NNI link. If the data packet is to be sent to a UNI link, the information in the VPI and VCI fields is substituted by the information obtained in this later table look-up, thus the VPI and VCI fields of the packet being merged to one field. In the corresponding way the GFC, VPI and VCI fields are merged to one field and then thus the contents of these GFC, VPI and VCI fields are replaced by a new unified VPI and VCI number, when the packet is to be forwarded to an NNI link. In the latter case, thus also the information in the GFC field is overwritten.

Further, both for VP and VC connections an additional information unit is inserted in the data packet in its identification part but outside the label field, in the shape of an addressing mode bit AM, indicating if the data packet belongs to a VP connection or to a VC connection.

Figure 3:
Figure 1:
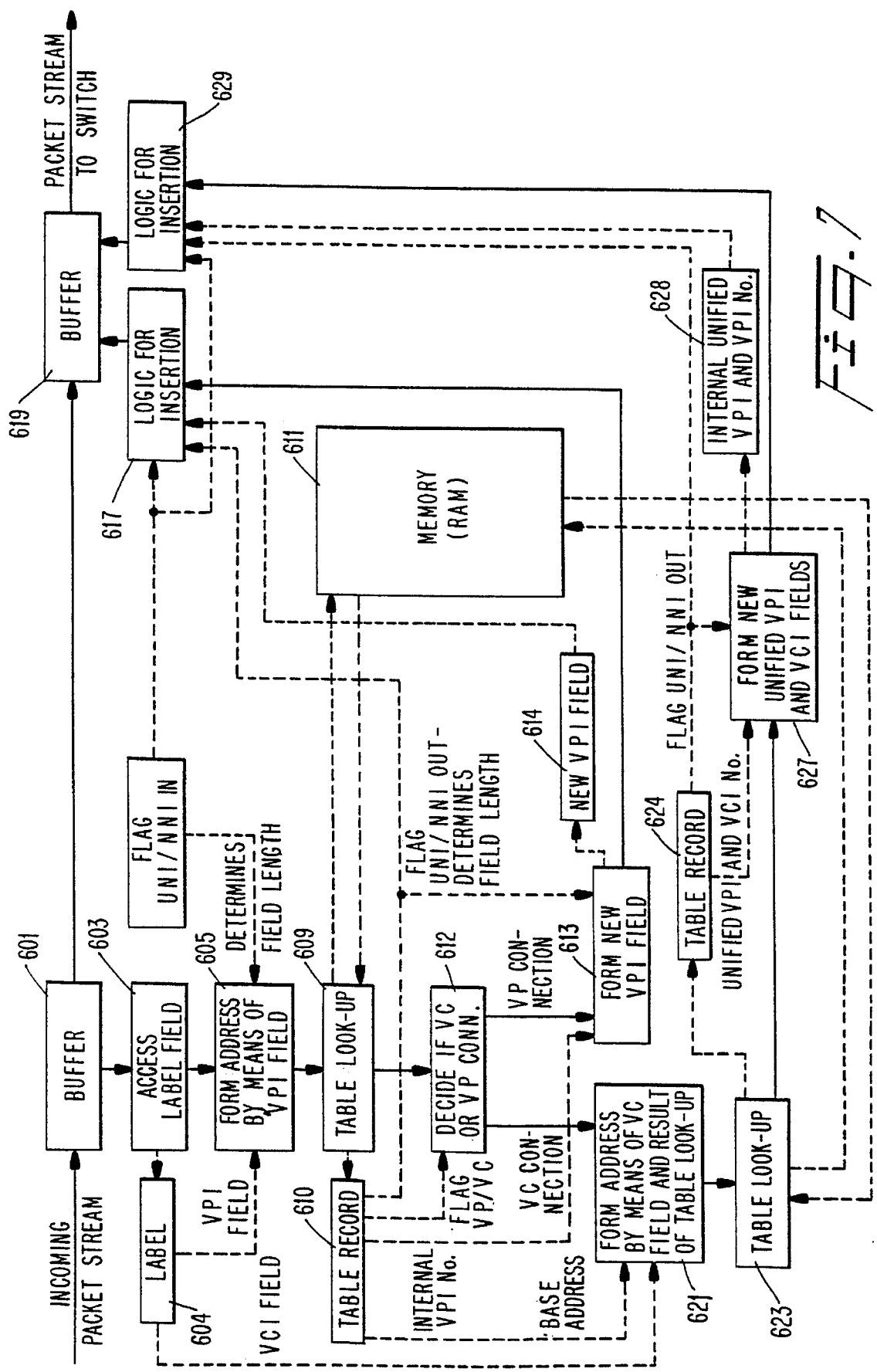

A data packet arriving to a switch unit 3 on a connection line, which is not directly connected to an end station 1, has the configuration illustrated at the top in FIG. 3. Here there is a VPI field comprising 12 bits and a VCI field comprising 16 bits. In the substitution or replacement of the information in the VPI and VCI label fields inside the identification field of the arriving data packet a procedure is performed analogous to the one described above, with the exception that here there is no GFC field and, that when the packet is to be sent to a UNI link, a zeroed or reset GFC field is inserted, compare the lower part of FIG. 3.

Thus first a table look-up is performed by means of the contents of the VPI field. From the table look-up information is first obtained if the data packet belongs to a VP or a VC connection. In the former case also information is obtained if the packet is to be sent to a UNI or NNI connection. If the packet is decided to belong to a VP connection and is to be sent to a UNI link, in the beginning of the VPI field a reset GFC field comprising four zero bits is inserted, such that the VPI field is shortened, and further in this new shorter VPI field information is inserted which has been obtained in the table look-up. If the packet instead is to be next transferred through an NNI link, the information in the VPI field of the data packet is substituted by information obtained in the table look-up. In these two cases the information in the VCI field is unaffected. When it in the table look-up instead has been decided that the data packet belongs to a VC connection, an additional table look-up is performed based both on the information which has been obtained in the first table look-up and by means of the information present in the VCI field of the data packet. In this second table look-up, as above, information is obtained, whether the data packet is to be forwarded on a UNI or an NNI link. In the UNI case, in the beginning of the label, as above a reset GFC field is inserted, which thus will be a part of the original VPI field. Further a new label is obtained, which for transmission through a UNI link has a correspondingly shorter length and in the shape of a unified VPI and VCI number it is inserted in both the rest of the VPI field and the whole VCI field in the original data packet. In the transmission through an NNI link the new unified VPI and VCI number has a whole length and replaces the all of the original VPI and VCI fields. Further, the addressing mode bit AM is inserted in the data packet in the same way as described above.

In FIGS. 4 and 5 it is schematically illustrated a possible organization of the tables, in which table look-ups are performed in the translations or substitutions, described above with reference to FIGS. 2 and 3, of the labels on an incoming link.

As is illustrated in FIG. 4, for each VPI number, that is for each contents of the VPI field, of an incoming data packet there is a record of three fields. The contents of the field illustrated rightmost in the figure indicate if the connection is a VP connection or a VC connection. This field is a simple flag field comprising one bit and storing the value 1 or 0. There is another similar flag field comprising one bit, which is shown to the left of the mentioned field. This middle field contains a flag, indicating if the connection will next continue to a link of type UNI or type NNI. Further there is in each record in the table a longer part comprising 12 bits, in which, for VP connections, the new internal label is located or stored. In the case where the connection will next continue to a UNI link, however, the four first bits in this field are not used. In the case where the connection is a VC connection, there is instead of a new internal label a base address located in the mentioned field. This base address is used in the second table look-up.

In FIG. 5 the structure of the second table is schematically illustrated, which is used only for VC connections. The table contains a number of records, which are addressed by means of both the base address which has been taken from the table of FIG. 4, and the VCI number of the data packet, that is the contents of the VCI field of the packet, for instance by an addition of the base address and the VCI number of the data packet. In the same way as in the table of FIG. 4, there is in each record a flagfield of one bit length storing a flag indicating if the connection next continues to a UNI or NNI connection respectively. In a longer field the information is located which is to replace the contents of the VPI and VCI fields of the data packet. In a practical case with a number of simultaneously established connections which is not too great, this new field can for instance comprise 16 bits and contain the new internal label, which in this case then will replace the information only in the VCI field of the data packet, while in the information in the VPI field is reset. If desired, the record can of course contain a still longer field at most comprising 28 bits, if the number of connections simultaneously established is very large.

An alternative structure of a table used for the label translation of an arriving data packet is illustrated in FIG. 6. Here for an incoming link of NNI type, all possible contents of the whole label field considered as one field, i.e. the joined VPI and VCI fields of an arriving data packet, are listed or stored in a sequential order. For an incoming link of UNI type the unified contents of the VPI and VCI fields of the incoming data packets, in the same way considered as one field, are inserted and stored in a sequential order (this case is not shown). The whole internal label of a data packet belonging to some connection is in this case obtained from the position of the label of the data packet in the list of contents, or from the address of the position in a memory, where exactly these contents are stored. For every possible contents there is like above a simple bit position having a flag indicating if the data packet is to be forwarded next to an output of the switch unit connected to a link of UNI or NNI type.

In FIG. 7 a block diagram is shown illustrating the label processing in the input side of an interface unit, where a table structure according to FIGS. 4 and 5 is used, the interface unit being connected to a switch unit 3. The data packets first arrive to a buffer 601 and here, from a received packet, its label field is accessed or extracted in a block 603 and it is stored in a register or memory field 604. Then only the VPI field is taken out of the whole label field stored in 604 in a block 605, where the length of the VPI field is determined by means of a flag, which is stored in a memory cell 607 and has been set earlier in the configuration or setup of the switching port, to provide an indication if the input link is of UNI or NNI type. By means of the contents of the VPI field a table look-up is performed in a block 609 in a write and read memory 611 and a table record 610 is obtained temporarily stored in a memory field 610. By means of the result of the table look-up it is decided in a block 612, if the data packet belongs to a VP connection or a VP connection. In the former case the table look-up directly gives a new VPI field 614, which is formed in a block 613, and also a flag "UNI/NNI out" indicating, if the output link, to which the data packet will be forwarded next, is of UNI or NNI type. Both the new VPI field and the obtained flag of output link are fed to logic circuits 617 for the insertion of a new VPI field, the length thereof being determined by the flag "UNI/NNI out", and for a possible reset of a now formed GFC field, determined by the two flags "UNI/NNI in" and "UNI/NNI ut" in combination. Therefor the logic circuits 617 also need information whether the input link is of UNI or NNI type, which is obtained from the flag "UNI/NNI in" stored in the memory field 607. The logic circuits 617 for the insertion then place the new label information and the addressing mode bit AM in the data packet when it for instance travels through a buffer 619. The buffers 601 and 619 may be the same physical buffer.

When in the block 612 for the decision based on the result of the table look-up in the block 609, it is instead decided, that the arrived data packet belongs to a VC connection, a new address is formed in a block 621 by means of the contents of the VCI field of the data packet and also by means of the table record stored in the cell 610 containing the result of the table look-up already performed in the block 609. An alternative hereto is to directly use, instead of the result of this former table look-up, the contents of the VPI field used in the block 605. Then another table look-up is performed in a block 623 in the write and read memory 611. Here as above a table record stored in a memory field 624 is obtained containing among other things a flag "UNI/NNI out" indicating, if the link, to which the data packet will be next transferred, is of UNI or NNI type respectively. Further, in a block 627 a new unified VPI and VCI field is obtained and temporarily stored in a memory field 628. The unified field stored in the field 628 obtained in this later table look-up is as above transferred to a logic block 620, to insert in the data packet in the buffer 609 the new label in the VCI field, in the corresponding case a reset of the part of the VPI field which will form a new GFC field, and possibly a further reset of the rest of the unified VCI and VPI field and insertion of the addressing mode bit AM which in this case indicates that the data packet belongs to a VC connection. Therefore, like the block 617, also this block 629 needs information from the memory cell 607, whether the link on which the data packet arrived is of UNI or NNI type respectively.

From the second buffer 619 the data packet is then transferred to the associated switch unit 3.

Inside the switching units 3 the data packets are transferred from an input connection point given in the establishment of the logical connection, to an output connection point by means of specific addresses, which are inserted in a particular, added internal header field, at the arrival of the data packet to a switch unit. These internal addresses are given in such a form that they easily can be decoded, for instance decoded directly by hardware, in the circuits inside the switch unit, without requiring any table look-up therefor. Data packets belonging to different connections can thus have the same internal address but they will always have different internal labels. At the arrival to an output connection point the internal header fields are removed and thus the internal address and then also a substitution or replacement is performed of the information in the label of the data packet. It will be described more closely with reference to FIGS. 8 and 9.

In FIG. 8, at the top thereof, thus the addressing mode bit AM and the label part are shown in the two different formats for a data packet which is to be transferred to an output connection point, which, through its associated switching port, is connected directly to an end station, i.e. a UNI link. As is further apparent from FIG. 8, it is decided by means of contents of the addressing mode bit, if the data packet belongs to a VP connection or a VC connection. The GFC field will in this case not be involved in the translation of the label part. It can contain information from earlier stages, if the data packet directly has arrived from a link of UNI type, or the field may contain only zeroes, if the packet has arrived to the switch unit on a link of NNI type. When the data packet, as is indicated by the AM bit, belongs to a VP connection, a table look-up is performed by means of the contents of the VPI field, and if the data packet belongs to a VC connection, all of the contents in the two fields VPI and VCI are used, where in many cases the VPI field will actually only contain zeroes and possibly the VCI field also in its most significant positions will have only zeroes. It is decided by the number of simultaneous connections which is to be handled by a switch unit and its switching ports. For a VP connection a new VPI number is obtained and it is inserted in the VPI field, the VCI field in this case being left unaffected. For a VC connection, from the table look-up a new VCI number is obtained, which is inserted in the VPI field of the data packet, and also a new VCI number which is inserted in the VCI field of the data packet. The addressing mode bit AM can be removed together with other information, which possibly has been added to the data packet in its travel through the switch unit, or be used for other purposes or simply be left.

FIG. 9 is drawn in the same way as FIG. 8 and illustrates the case of substitution of the label fields for a data packet which is to be sent to a link of NNI type. In the data packet there is then no GFC field and the VPI field or the unified VPI and VCI field is then correspondingly longer. In the same way as in FIG. 8, in addition a table look-up is performed for the two cases of a VP connection and a VC connection. The sole difference is that the VPI field is longer.

In FIG. 10 a block diagram is drawn illustrating the procedure of the substitution of labels is performed in a switching port of the output side of a switch unit. The data packets arrive from a switch unit 3 to a buffer 901, from which in a block 903, the label field of the data packet and the AM bit thereof are accessed and stored in a register or memory field 905. By means of the contents of the AM bit it is decided in a block 907, if the data packet belongs to a VP connection or a VC connection. In the former case, in a block 909 a suitable address is formed by means of the address in the VPI field in regard of its length which is obtained by means of a flag "UNI/NNI out", which is obtained from a memory cell 911, containing information if the output connection point is of UNI or NNI type. The table look-up for this case with a VP connection is performed in a block 913 by means of the address formed in the block 909. The table look-up is performed in a write and read memory 915. If it instead is decided in the block 907, that the data packet belongs to a VC connection, in a block 917 an address is formed by means of the contents of the VCI field of the data packet, in the general case the contents of both the VPI and VCI fields, but in a preferred practical case the VPI field in the label of the data packet is reset in its transfer through the switch unit 3. A table look-up is then performed in a block 919 by means of the address formed in the block 917. From the write and read memory 915 information is obtained, which in a block 923 is used to form the contents of new VPI and VCI fields temporarily stored in a memory field 921. By means of the flag stored in the register 911 indicating, if the output link is of UNI or NNI type and hereby the length of the VPI field, the new label is inserted in the data packet in a block 925 comprising appropriate logic circuits. The data packet can be considered as being stored in a buffer 927, which actually can be identical to the earlier mentioned buffer 901, to which the cell stream arrives directly from the switch. From the buffer 907 the data packet passes in the outgoing data packet stream through a connection line to an end station.

In a block 929 new contents, temporarily stored in a memory field 931, are formed in the case of a VP connection, by means of the result of the table look-up in the block 913. These contents in the memory 931 are to be inserted in the VPI field, and in the same way as for a VC connection there are logic circuits in a block 933 to insert these contents in the data packet which is supposed to be stored or hold in the buffer 927.

What is claimed is:

1. A switch for transferring data packets, each data packet having a label including a first part and a second part, comprising:

pluralities of input ports and output ports, wherein each input port has a list of internal labels including a first sublist and a second sublist; and a switch core for transferring data packets that have arrived at an input port to a selected output port;

wherein each input port performs, for a data packet that has arrived at the input port, a first table look-up in the first sublist based on the first part of the label of the arrived data packet, whereby an internal label is obtained, to determine whether a second table look-up should be performed; when the second table look-up should not be performed, the input port substitutes the internal, label obtained by the first table look-up for the first part of the label of the arrived data packet; and when the second table look-up should be performed, the input port performs the second table look-up in the second sublist based on the second part of the label of the arrived data packet, whereby an internal label is obtained, and substitutes the internal label obtained by the second table look-up for the label of the arrived data packet.

2. The switch of claim 1, wherein, in performing the second table look-up, the input port uses the first part of the label of the arrived data packet as an address.

3. The switch of claim 1, wherein the input port performs the first table look-up by:

forming a combination of the first part of the label of the arrived data packet and a first base address;

using the combination as an address of an internal label in the first sublist; and accessing the internal label corresponding to the address in the first sublist.

4. The switch of claim 1, wherein the input post performs the second table look-up by:

determining a pointer from information obtained by the first table look-up and from the second part of the label of the arrived data packet; and accessing, in the second sublist, an internal label corresponding to the pointer.

5. The switch of claim 1, wherein the input port performs the second table look-up by:

forming a combination of the second part of the label of the arrived data packet and a second base address obtained from the first table look-up;

using the combination as an address of an internal label in the second sublist; and accessing the internal label corresponding to the address in the second sublist.

6. The switch of claim 1, wherein each output port substitutes a forwarding label for the label of a data packet received by that output port.

7. The switch of claim 6, wherein each output port has a list of forwarding labels used for data packets to be forwarded by a respective output port, the list including a third sublist and a fourth sublist; each output port performs, when only the first part of the label of a data packet to be forwarded has been replaced, a third table look-up in the third sublist based on the first part of the internal label of the data packet to obtain a forwarding label, and substitutes that forwarding label for the first part of the label of the data packet; and each output port performs, when the label of the data packet to be forwarded has been replaced, a fourth table look-up in the fourth sublist based on the internal label of the data packet to obtain a forwarding label, and substitutes that forwarding label for the internal label of the data packet.

8. The switch of claim 7, wherein the output port performs the third table look-up by:

forming a combination of the first part of the internal label of the data packet and a third base address;

using the combination as an address for a forwarding label in the third sublist; and accessing the forwarding label corresponding to the address in the third sublist.

9. The switch of claim 7, wherein the output port performs the fourth table look-up by:

determining a pointer from information obtained by the third table look-up and from the second part of the internal label of the data packet; and accessing, in the fourth sublist, a forwarding label corresponding to the pointer.

10. The switch of claim 7, wherein the output port performs the fourth table look-up by:

forming a combination of the second part of the internal label of the data packet to be forwarded and a third base address obtained from the third table look-up;

using the combination as an address of a forwarding label in the fourth sublist; and accessing the forwarding label corresponding to the address in the fourth sublist.

11. The switch of claim 7, wherein the output port performs the fourth table look-up by:

forming a combination of the internal label of the data packet to be forwarded and a fourth base address;

using the combination as an address of a forwarding label in the fourth sublist; and accessing the forwarding label corresponding to the address in the fourth sublist.

12. A network for transferring data packets belonging to logical connections having either a first type or a second type, each data packet having a label including a first part and a second part and identifying the logical connection to which a data packet belongs, comprising:

a plurality of end stations, each end station being either a start point or an end point for a data packet;

a plurality of switch units, each switch unit having a plurality of input ports and output ports allows transferring of a, between which ports a data packet; and a connection line from each end station to one of an input port and an output port of a respective switch unit associated with each end station, and a plurality of connection lines between the input ports and output ports of the switch units, which are not connected to an end station;

wherein each switch unit establishes, when a data packet arrives from an end station associated with that switch unit, a logical connection to another end station, logical connection being established through that switch unit and in the network in cooperation with other switch units, and determines an internal label having a first part and a second part for the logical connection;

each input port has a list of internal labels including a first sublist and a second sublist and substitutes an internal label for the label of a data packet arrived at that input port on a connection line which is established for the logical connection to which the data packet belongs;

when a data packet belongs to the first type of logical connection, the input port at which the data packet arrives performs a first table look-up in the first sublist based on the first part of the label of the arrived data packet to obtain an internal label, and substitutes that internal label for only the first part of the label of the arrived data packet; and when a data packet belongs to the second type of logical connection, the input port at which the data packet arrives performs a second table look-up in the second sublist based on the second part of the label of the arrived data packet to obtain an internal label, and substitutes that internal label for the label of the arrived data packet.

13. The network of claim 12, wherein the first sublist in an input port of a switch unit comprises information relating to the type of logical connection and that input port performs, for all data packets arrived at that input port, the first table look-ups based on the first part of the labels of the arrived data packets to obtain the types of logical connection to which the arrived data packets belong.

14. The network of claim 12, wherein an input port of a switch unit inserts information regarding the type of logical connection in a data packet arrived at that input port.

15. The network of claim 14, wherein an output port in a switch unit removes the information regarding the type of logical connection from a data packet to be forwarded by the switch unit removing the information.

16. The network of claim 12, wherein an input port in a switch unit performs the first table look-up by:

forming a combination of the first part of the label of an arrived data packet and a first base address;

using the combination as an address of an internal label in the first sublist; and accessing the internal label corresponding to the address in the first sublist.

17. The network of claim 13, wherein, when a data packet belongs to a logical connection of the second type, the input port in the switch unit at which the data packet arrives performs the second table look-up by:

determining a pointer from information obtained by the first table look-up and from the second part of the label of the arrived data packet; and accessing, in the second sublist, an internal label corresponding to the pointer.

18. The network of claim 13, wherein, when a data packet belongs to a logical connection of the second type, the input port in the switch unit at which the data packet arrives performs the second table look-up by:

forming a combination of the second part of the label of the arrived data packet and a second base address obtained from the first table look-up;

using the combination as an address of an internal label in the second sublist; and accessing the internal label corresponding to the address in the second sublist.

19. The network of claim 12, wherein each switch unit, in establishing a logical connection, determines a forwarding label for the established connection, and an output port in a switch unit, from which port a data packet is to be forwarded, substitutes the determined forwarding label for the logical connection to which the data packet belongs for the internal label of the data packet.

20. The network of claim 19, wherein each output port has a list of forwarding labels used for data packets to be forwarded by the respective output port, the list including a third sublist and a fourth sublist; each output port performs, when the data packet to be forwarded belongs to the first type of logical connection, a third table look-up in the third sublist based on the first part of the internal label of the data packet to obtain a forwarding label, and substitutes that forwarding label for the first part of the label of the data packet; and each output port performs, when the data packet to be forwarded belongs to the second type of logical connection, a fourth table look-up in the fourth sublist based on the internal label of the data packet to obtain a forwarding label, and substitutes that forwarding label for the internal label of the data packet.

21. The network of claim 20, wherein the output port performs the third table look-up by:

forming a combination of the first part of the internal label of the data packet and a third base address;

using the combination as an address for a forwarding label in the third sublist; and accessing the forwarding label corresponding to the address in the third sublist.

22. The network of claim 20, wherein the output port performs the fourth table look-up by:

determining a pointer from information obtained by the third table look-up and from the second part of the internal label of the data packet; and accessing, in the fourth sublist, a forwarding label corresponding to the pointer.

23. The network of claim 20, wherein the output port performs the fourth table look-up by:

forming a combination of the second part of the internal label of the data packet to be forwarded and a third base address obtained from the third table look-up;

using the combination as an address of a forwarding label in the fourth sublist; and accessing the forwarding label corresponding to the address in the fourth sublist.

24. The network of claim 20, wherein the output port performs the fourth table look-up by:

forming a combination of the internal label of the data packet to be forwarded and a fourth base address;

using the combination as an address of a forwarding label in the fourth sublist; and accessing the forwarding label corresponding to the address in the fourth sublist.

25. The network of claim 12, wherein data packets that either arrive directly from an end station or are forwarded directly to an end station have a first label format and data packets that are forwarded between switch units have a second label format;

each input port includes an indicator element for each logical connection having data packets passing through the respective input port, the indicator element indicating whether a data packet arriving at the input port, after being transferred through the respective switch unit, is to be forwarded from the switch unit directly to an end station or not; and when a data packet arrives at an input port, that input port decides, based on the indicator element for the logical connection to which that data packet belongs, whether that data packet is to be forwarded directly from the switch unit to an end station;

when the data packet is to be forwarded directly from the switch unit to an end station, that input port substitutes an internal label having the first format for the label of the data packet; and when the data packet is not to be forwarded directly from the switch unit to an end station, that input port substitutes an internal label having the second format for the label of the data packet.

26. The network of claim 12, wherein at least one list in a port contains sequentially all possible contents of label fields which a data packet received by that port can have, and that port determines either the internal label or the forwarding label which is to be substituted for the label of a data packet received by the port from one of the label's position and sequential number in the list.

27. The network of claim 12, wherein upon an arrival of a data packet at an input port of a switch unit, that input port adds to the data packet an extra field, in which an internal address of the data packet is inserted indicating how the data packet is to be transferred inside the switch unit, and each output port of the switch unit is adapted to subtract the extra field from the data packet when the data packet is forwarded from the switch unit.

* * * * *